United States Patent [19]

Pantaleo et al.

[11] Patent Number: 5,047,267

[45] Date of Patent: Sep. 10, 1991

[54] PROTECTIVE SERVING MAT

[76] Inventors: Terese A. Pantaleo, 7854 Redondo La., Orland Park, Ill. 60462; Donald E. Perrin, 255 N. 6th St., Clinton, Iowa 52732

[21] Appl. No.: 365,836

[22] Filed: Jun. 13, 1989

[51] Int. Cl.[5] .................................................. B32B 3/20

[52] U.S. Cl. .......................................... 428/13; 40/426; 428/166; 428/321.5; 428/900; 446/267

[58] Field of Search ......................... 40/426; 273/1 L; 428/14, 166, 321.5, 900, 13; 446/156, 159, 267; 220/405-406

[56] References Cited

U.S. PATENT DOCUMENTS

| | | | |
|---|---|---|---|
| 2,589,601 | 3/1952 | Burnett | 428/900 X |
| 3,032,926 | 5/1962 | Lang | 40/426 X |
| 3,983,277 | 9/1976 | Ackerman et al. | 428/13 X |
| 4,057,921 | 11/1977 | Ball | 428/13 X |
| 4,359,224 | 11/1982 | Nottingham et al. | 273/1 L |
| 4,390,575 | 6/1983 | Kopp | 428/166 X |
| 4,528,224 | 7/1985 | Ausnit | 428/99 X |
| 4,561,109 | 12/1985 | Herrington | 24/576 X |
| 4,631,210 | 12/1986 | McGee et al. | 428/13 |
| 4,686,784 | 8/1987 | Smithies | 428/13 X |
| 4,736,853 | 4/1988 | O'Mara | 428/100 X |
| 4,738,888 | 4/1988 | Pantal et al. | 428/166 |

*Primary Examiner*—Henry F. Epstein
*Attorney, Agent, or Firm*—Wallenstein Wagner & Hattis, Ltd.

[57] ABSTRACT

A protective serving mat is disclosed comprising generally flat first and second chambers superimposed on each other. The first chamber is transparent and is adapted to embody fluid media and objects suspended therein for amusement. The first chamber includes a resealable opening so that a user may access the first chamber to alter the contents as desired. The second chamber is visible through the first chamber and is used to protect and display generally flat items such as papers with sealing decorative or amusing indicia or menus. The second chamber includes an opening to allow access to the chamber so that the menus or indicia bearing papers can be varied as desired by a user.

8 Claims, 2 Drawing Sheets

FIG-1
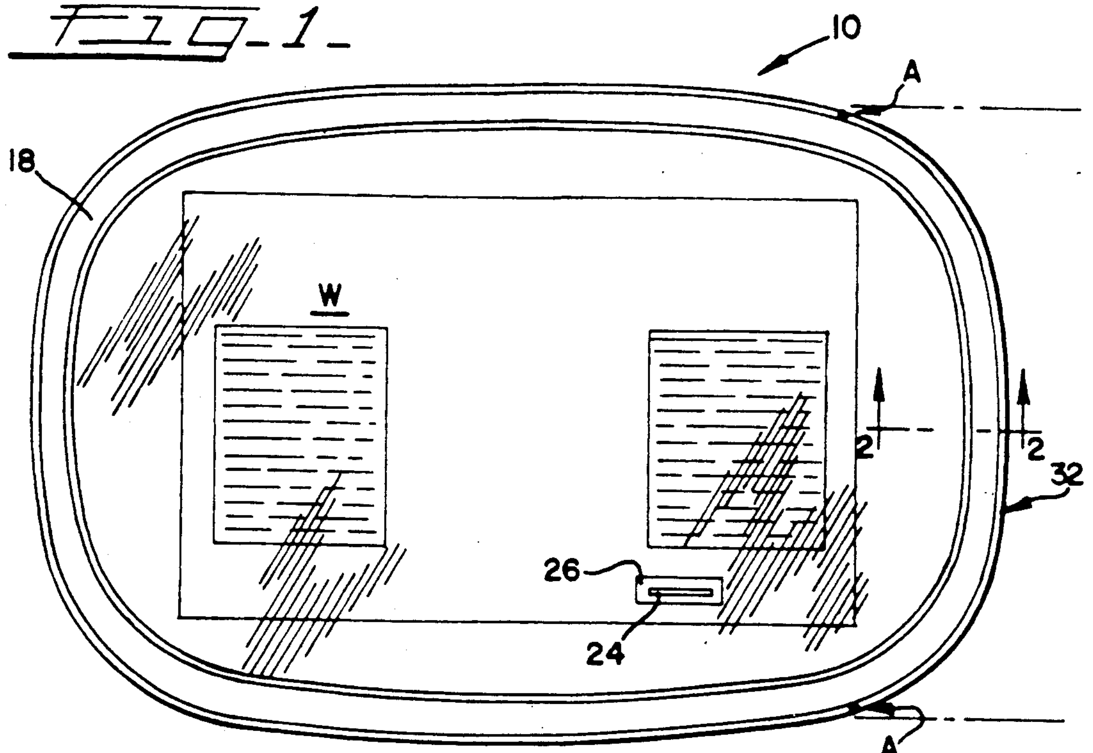
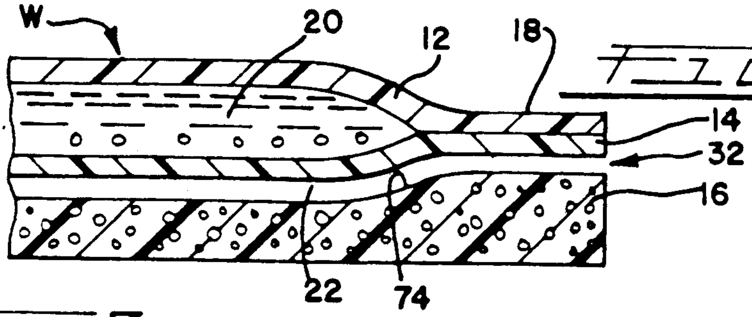
FIG-2
FIG-3
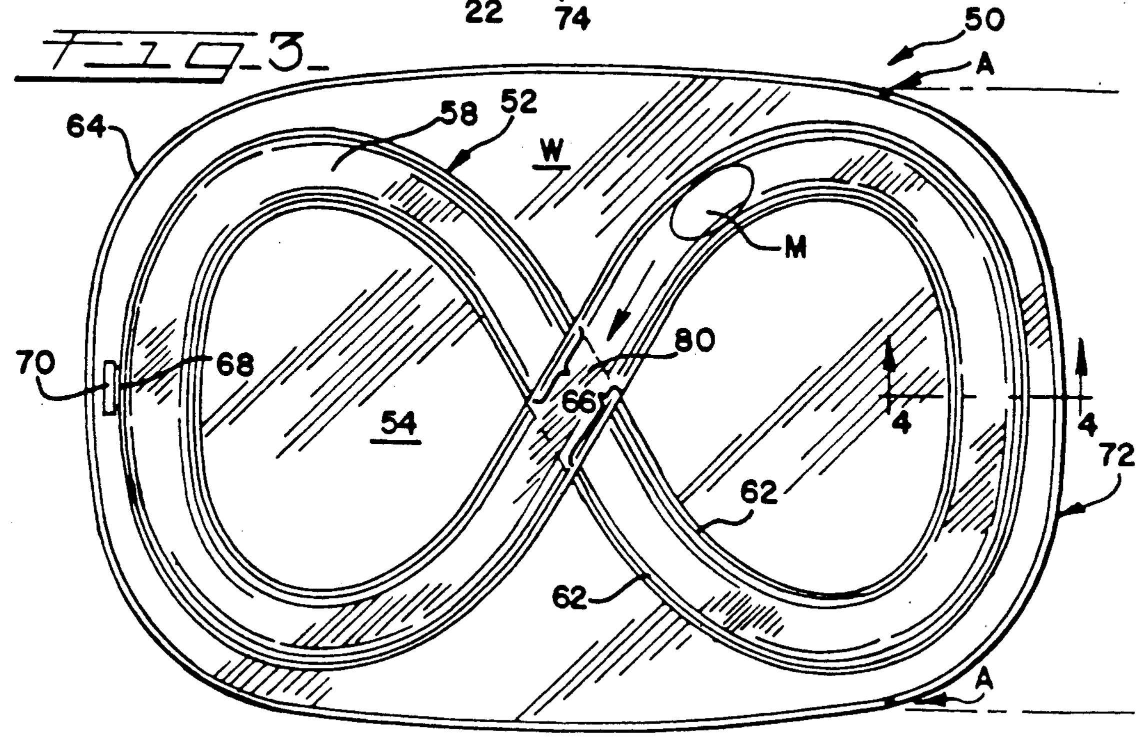

PROTECTIVE SERVING MAT

DESCRIPTION

1. Technical Field

The present invention generally relates to protective serving mats and more particularly to a serving mat which also acts as an amusement device.

2. Background of the Invention

Protective serving mats such as placemats and coasters are used extensively for serving food and beverage products in various public facilities as well as in the home. Usually, restaurants that cater to children will provide some type of amusement for the customers and many times these amusement devices are embodied into the placemats that are used for serving the food. For example, U.S. Pat. No. 4,738,888 ("the '888 patent") discloses a protective serving mat which is reusable and embodies a reusable amusement device.

Specifically, the '888 patent discloses a serving mat including a pair of superimposed pliable sheets sealed to each other to define a chamber. The chamber contains a free flowing medium such as water. A plurality of discrete articles are suspended in the liquid medium and are movable by manipulation of the liquid in the chamber. An upper sheet of the serving mat is transparent so that an inner surface of a lower sheet of the serving mat and the contents of the chamber can be seen. The inner surface of the lower sheet of the serving mat carries fanciful indicia thereon.

Although the serving mat disclosed in the '888 patent is an improvement over previous serving mats, several problems exist. For example, the fluid media is by nature relatively dense and thus represents a major source of weight in the finished serving mat. As a result, the weight of the fluid substantially increases the shipping costs of the serving mats. The fluid nature of the liquid media also presents stresses on the finished serving mat during shipping and handling. These stresses can result in damage to the serving mat, which may cause leakage. Shipping and storage in cold weather can also cause freeze damage when water base fluids are used in the serving mat.

Another problem of the serving mat disclosed in the '888 patent, is that a consumer cannot change the indicia or the fluid media of the mat in accord with changing decor or when the amusement provided by the mat becomes too familiar to the consumer.

Another problem exists in the food serving art. Menus used in restaurants are frequently changed to reflect changing prices and food items. Therefore, conventional menus are printed on inexpensive materials such as paper to reduce costs when corrections are made.

Paper menus become easily soiled and tattered after a short amount of use. Attempts have been made to alleviate this problem by providing transparent covers for the paper menus or by providing laminated paper menus. However, these menus still require the extra labor and inconvenience of first placing the menus on a restaurant table when a customer is seated and then removing the menus after a customer has made their food selection. The menus must also be returned to a table if additional selections are desired.

SUMMARY OF THE INVENTION

According to the present invention, a protective serving mat has been developed that is reusable and provides for consumer interchangeability of fluid media and movable objects therein which can be utilized for amusement during idle times in a restaurant or at home. The present invention also provides for the interchangeable display and protection of a menu or decorative and/or amusing indicia.

Generally, the present invention includes three sheets superimposed on each other to define first and second chambers.

Specifically, an upper transparent sheet and an intermediate transparent sheet are superimposed on each other. The sheets are interconnected around a margin thereof to define a transparent, generally flat, first chamber therebetween. The first chamber includes an opening equipped with a suitable closure means so that a consumer may have access to the chamber to interchangeably add movable objects and a fluid media for facilitating a desired amusement.

According to another aspect of the invention, the base sheet is interconnected to the intermediate sheet along the margin thereof to define a second chamber between the base sheet and the transparent intermediate sheet. The second chamber includes an opening which is dimensioned to allow the interchangeable addition of flat objects such as menus or sheets bearing fanciful indicia.

A menu or other indicia once contained in the second chamber is visible through the transparent first chamber for display. The menu or indicia is protected from soil and damage and may be changed easily and inexpensively as desired by a consumer. Furthermore, a menu displayed in the serving mat need not be distributed and collected prior to a customer's being seated at a table and after having made a selection. Alternately, amusement indicia received in the serving mat may also be changed to reflect new or alternate amusement criteria.

Advantageously then, the protective serving mat of the invention can be shipped to customers without the added weight of the fluid media or without the damage caused by the fluid during shipping. The serving mat can also be marketed to consumers in a single form which allows individual consumers to adapt the serving mat to their own needs and tastes. Furthermore, the consumer can subsequently change the contents of the first and/or second chamber as desired for example to match the decor of a restaurant or kitchen when changed. Similarly, the consumer can change the contents of the first and/or second chamber to vary the type of game that may be played with the serving mat.

According to a modification of the invention, the first chamber may be alternately configured in a manner such that the interconnection between the first and second transparent sheets defines a tubular chamber. The tubular chamber is re-sealable so that a consumer may fill or empty the chamber with a fluid media. The tubular chamber includes a magnet which is dimensioned to be movable within the channel. For amusement purposes, the magnet may be moved through the channel by holding a metallic object such as a spoon near the surface of the channel and directing the magnet therein.

Other advantages and aspects of the invention will become apparent upon making reference to the specification, claims, and drawings to follow.

BRIEF DESCRIPTION OF THE DRAWINGS

FIG. 1 is a plan view of the placemat having features of the present invention incorporated therein;

FIG. 2 is a cross-sectional view as viewed along line 2—2 of FIG. 1;

FIG. 3 is a view similar to FIG. 1 showing a modified form of the placemat;

DETAILED DESCRIPTION OF THE INVENTION

Figure 5:
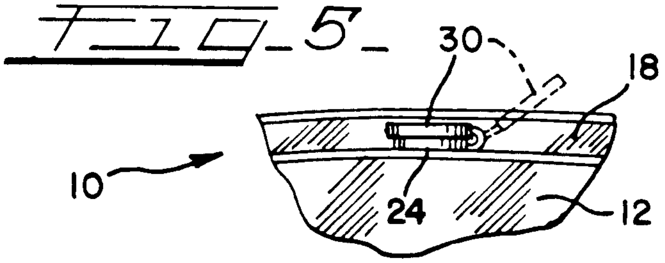
FIG. 5 is a partial plan view of the serving mat of FIG. 1 disclosing an alternate closure of the invention; and, FIG. 6 is a perspective view of a base sheet of the embodiment of FIG. 3.

While this invention is susceptible of embodiment in many different forms, there is shown in the drawings, and will herein be described in detail, preferred embodiments of the invention. The present disclosure is to be considered as an exemplification of the principles of the invention and is not intended to limit the broad aspect of the invention to embodiments illustrated.

FIG. 1 of the drawings discloses a serving mat such as a placemat, generally designated by reference numeral 10. The placemat 10 is generally rectangular in plan view and generally consists of a first or upper sheet 12, a second or intermediate sheet 14 and a third or base sheet 16. As best disclosed in FIG. 2, the sheets 12, 14 and 16 are superimposed on each other and are interconnected as disclosed below to define a first chamber 20 and a second chamber 22.

Upper sheet 12 and intermediate sheet 14 are pliable and substantially transparent materials such as polyvinyl chloride or polypropylene. As best disclosed in FIG. 2, sheets 12 and 14 are interconnected along a margin 18 of the placemat 10; thus defining the generally flat chamber 20 between upper sheet 12 and intermediate sheet 14. Base sheet 16 is interconnected to intermediate sheet 14 along margin 18; thus defining the second chamber 22. Chamber 22 is substantially flat and dimensioned to envelope flat objects such as menus, pictures or papers carrying amusement indicia.

Preferably, sheets 12, 14 and 16 are interconnected by heat sealing such as by a sonic heat source.

Chamber 20 includes a resealable opening 24 to allow a consumer to fill or empty chamber 20 when desired. Opening 24 is suitably dimensioned to allow the passage of amusement objects as well as fluid. In a preferred embodiment, opening 24 is in the form of a narrow slot in upper sheet 12. Opening 24 is preferably sealed by a suitable transparent pressure sensitive tape 26, as disclosed in FIG. 1.

In other embodiments, chamber 20 may include an alternate means for allowing consumer access to the chamber. For example, FIG. 5 discloses an opening 24 formed between upper sheet 12 and intermediate sheet 14. A closure 30 is provided for resealing the chamber 20 after filling or emptying the chamber.

Second chamber 22 includes an elongated opening 32 which is dimensioned to allow passage of a flat object such as a menu or papers carrying amusement or decorative indicia. In a preferred embodiment, opening 32 is formed by omitting the interconnection between base sheet 16 and intermediate sheet 14 along a portion of margin 18 between the points identified as A in FIG. 1.

As best disclosed in FIG. 2, to access chamber 22 a consumer need only slide the desired flat object through opening 32. Retrieval of the flat object is aided by the pliability of the sheets 12, 14 and 16, whereas, the sealed sheets 12 and 14 can be spread apart from sheet 16 slightly to grasp the flat object once inserted.

According to a broad aspect of the invention, the upper sheet 12 and the intermediate sheet 14 are heat sealable materials which can be interconnected along any desired intermediate path to define intermediate chambers. For example, FIGS. 3, 4 and 6 disclose a serving mat 50 including an intermediate tubular chamber.

Figure 4:
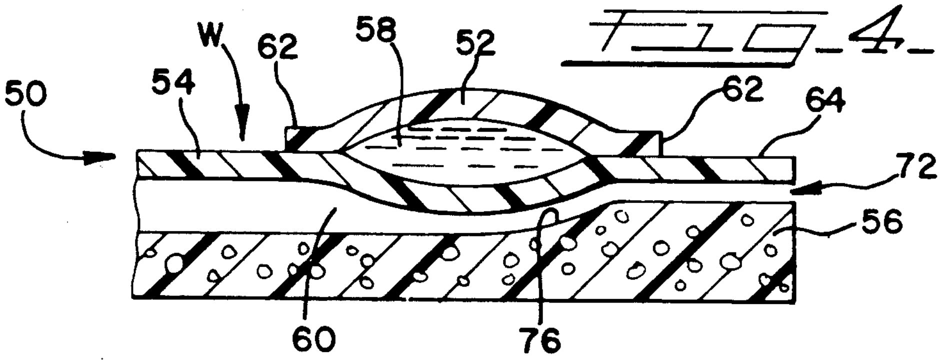
FIG. 4 is a partial cross sectional view of the placemat of FIG. 3 taken along line 4—4 of FIG. 3.

As best disclosed in FIG. 4, serving mat 50 generally includes a first or upper sheet 52, an intermediate sheet 54 and a base sheet 56. The sheets 52, 54 and 56 are superimposed on each other and interconnected to define a first or tubular chamber 58 and a second chamber 60 between the sheets, as disclosed below. A magnet M is disposed within tubular chamber 58. Magnet M and tubular chamber 58 are dimensioned so that magnet M can be externally manipulated through tubular chamber 58 by utilization of the magnetic properties of magnet M. For example, a consumer can direct the magnet by moving a spoon in sufficient proximity to the magnet, along an outside surface of tubular chamber 58.

Upper sheet 52 and intermediate sheet 54 are pliable and substantially transparent materials such as poly vinyl chloride or polypropylene.

Intermediate sheet 54 and base sheet 56 are generally rectangular in plan view. Upper sheet 52 is in the form of a flat, transparent ribbon or strip having opposed parallel edges 62. Upper sheet 52 is interconnected to intermediate sheet 54 along edges 62 to define tubular chamber 58. In a preferred embodiment, tubular chamber 58 is in the form of a continuous figure "8", as disclosed in FIG. 3. In this configuration, upper sheet 52 is applied to intermediate sheet 54 as a continuous strip, wherein, the edges 62 of the strip are interconnected to the material immediately underlying the sheet 52 as it is positioned. As a result, the edges 62 will be interconnected to intermediate sheet 54 over most of their extent but will be interconnected to a portion of upper sheet 52 along an area 66 where the upper sheet 52 crosses itself in making the figure "8". Thus, tubular chamber 58 is a continuous tubular chamber.

Tubular chamber 58 includes an opening 68 with a closure 70 to allow a consumer to resealably access the chamber 58 so that the consumer can fill the chamber with a fluid media.

Intermediate sheet 54 is interconnected to base sheet 56 along a margin 64 of serving mat 50 to define second chamber 60. Second chamber 60 includes an opening 72 dimensioned so that flat objects such as menus or papers carrying amusement indicia may be replaceably added to the second chamber by the consumer. Preferably opening 72 is formed by omitting interconnection along a portion of margin 64 between the points identified as A in FIG. 3.

Figure 6:
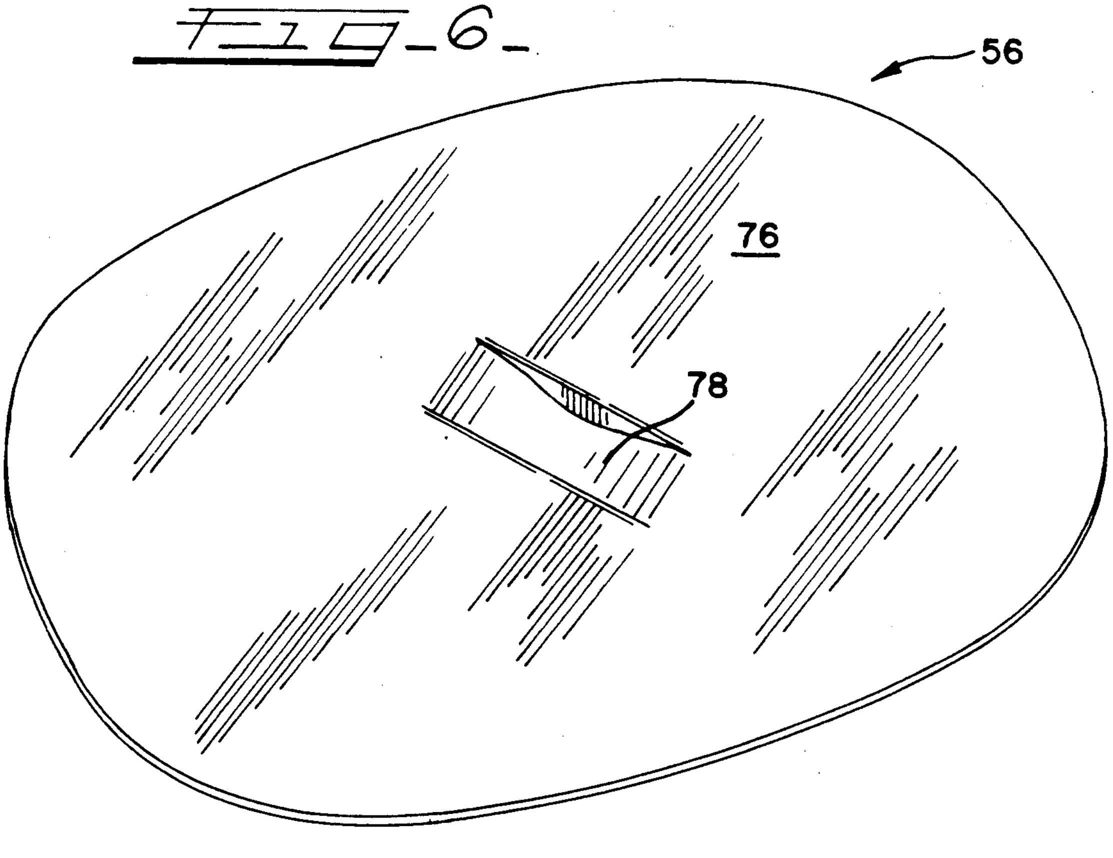

In preferred embodiments of the invention, the base sheets 16 and 56 of serving mats 10 and 50 are molded foam rubber. FIGS. 2, 4 and 6 best disclose that, as molded, base sheets 16 and 56, each have contoured upper surfaces 74 and 76 respectively. Surfaces 74 and 76 accommodate the overlying chambers 20 and 58 respectively so that the serving mats 10 and 50 present a generally flat and level working surface W. for example, as disclosed in FIG. 6, upper surface 76 of base sheet 56 includes a depression 78. Depression 78 is dimensioned to receive an underlying portion 80 (shown in dashed lines of FIG. 3) of tubular chamber 58 as necessitated by the figure "8" shape of the chamber.

While the invention has been described with reference to a preferred embodiment, it will be understood by those skilled in the art that various changes may be made and equivalents may be substituted for elements thereof without departing from the broader aspects of the invention. For example, sheets 52 and 54 could be reversed to provide a continuous upper exposed surface. Also, it is intended that broad claims not specifying details of a particular embodiment disclosed herein as the best mode contemplated for carrying out the invention should not be limited to such details.

We claim:

1. A protective serving mat comprising:

a first sheet and a second sheet superimposed on each other and interconnected to define a first chamber for holding a liquid;

said first sheet being substantially transparent so that a content of said chamber in said liquid is visible through said first sheet;

an opening in said first chamber adapted to allow repeated access to said first chamber so that a user can interchangeably add a desired content to said first chamber;

closure means removably attached to said opening for sealing and resealing said opening; and, a second, separate chamber disposed adjacent said first chamber, said second chamber being visible through said first chamber.

2. A protective serving mat comprising:

a substantially transparent, horizontal and generally flat, pliant first chamber for holding a liquid superimposed on a base sheet;

said first chamber holding a liquid and interconnected to said base sheet to define a second chamber between said first chamber and said base sheet;

said second chamber being visible through said first chamber; and, an opening between said first chamber and said base sheet adapted to allow access into said second chamber so that a user may interchangeably place objects into said chamber for display.

3. The protective serving mat of claim 2 wherein said first chamber includes a resealable opening adapted to allow a consumer to access said first chamber to interchangeably add objects and fluid media.

4. A protective serving mat comprising:

a first sheet and a second sheet superimposed on each other and interconnected to define at least one first chamber for containing a liquid; a second chamber;

a magnet located in said liquid containing first chamber, said magnet being dimensioned to be movable in said chamber;

said first sheet being substantially transparent so that a content of said chamber, including said magnet, is visible through said first sheet;

whereby, said magnet can be manipulated externally of said first chamber by utilizing an external metal object.

5. The protective serving mat of claim 4 wherein said first chamber is a continuous tubular chamber.

6. The protective serving mat of claim 5 wherein said first chamber includes a resealable opening adapted to allow a consumer access to said continuous tubular chamber so that objects and fluid can be interchangeably added to said continuous tubular chamber.

7. The protective serving mat of claim 4 wherein said second sheet is transparent and said second sheet is superimposed on a base sheet;

said second sheet and said base sheet being interconnected to define a second chamber;

said second chamber including an opening dimensioned to allow a consumer to interchangeably add flat objects to said second chamber such as menus or papers carrying amusement indicia.

8. A protective serving mat comprising:

a substantially transparent and generally flat first chamber for holding a liquid superimposed on a base sheet;

said first chamber interconnected to said base sheet to define a second chamber between said first chamber and said base sheet;

said second chamber being visible through said first chamber;

an opening in said second chamber adapted to allow access into said second chamber so that a user may interchangeably place objects into said chamber for display;

an opening in said first chamber adapted to allow repeated access to said first chamber so that a user can interchangeably add a desired content to said first chamber; and, closure means removably attached to said opening for sealing and resealing said opening.

* * * * *